United States Patent
Tezuka (10) Patent No.: US 10,481,338 B2
(45) Date of Patent: Nov. 19, 2019

(54) OPTICAL FIBER SENSOR MEASURING APPARATUS

(71) Applicant: YOKOGAWA ELECTRIC CORPORATION, Tokyo (JP)

(72) Inventor: Shin-ichirou Tezuka, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/117,796

(22) Filed: Aug. 30, 2018

(65) Prior Publication Data

US 2019/0064446 A1    Feb. 28, 2019

(30) Foreign Application Priority Data

Aug. 31, 2017 (JP) .................. 2017-166322

(51) Int. Cl.
| | |
|---|---|
| *G02B 6/00* | (2006.01) |
| *G02B 6/36* | (2006.01) |
| *G01D 5/353* | (2006.01) |
| *G01K 11/32* | (2006.01) |

(52) U.S. Cl.
CPC ....... *G02B 6/3644* (2013.01); *G01D 5/35374* (2013.01); *G01K 11/32* (2013.01); *G02B 6/3636* (2013.01); *G01K 2011/322* (2013.01)

(58) Field of Classification Search
USPC ........................................... 385/12
See application file for complete search history.

(56) References Cited

U.S. PATENT DOCUMENTS

| | | | |
|---|---|---|---|
| 7,412,118 B1 | 8/2008 | Shaibani et al. | |
| 7,495,207 B2 * | 2/2009 | Ogura | G01J 1/04 |
| | | | 250/200 |
| 2008/0237485 A1* | 10/2008 | Beinhocker | G01T 1/167 |
| | | | 250/474.1 |
| 2010/0040108 A1 | 2/2010 | Sasaoka et al. | |
| 2011/0051123 A1* | 3/2011 | Kunigami | G01B 11/18 |
| | | | 356/32 |
| 2015/0308905 A1* | 10/2015 | Niizuma | B60L 11/182 |
| | | | 356/73.1 |
| 2016/0238288 A1* | 8/2016 | Zoetemeijer | G01K 11/32 |
| 2016/0258795 A1 | 9/2016 | Farhadiroushan et al. | |
| 2016/0349085 A1* | 12/2016 | Yang | A61B 5/0205 |
| 2019/0187536 A1* | 6/2019 | Sugiyama | G02F 1/225 |

FOREIGN PATENT DOCUMENTS

| | | |
|---|---|---|
| JP | 2009-139241 A | 6/2009 |
| WO | 2008/084637 A1 | 7/2008 |
| WO | 2015/056012 A1 | 4/2015 |

OTHER PUBLICATIONS

Extended European Search Report on counterpart European Application No. 18191163.7, dated Dec. 11, 2018 (7 pages).

* cited by examiner

*Primary Examiner* — Eric Wong
(74) *Attorney, Agent, or Firm* — Osha Liang LLP (57) ABSTRACT

An optical fiber sensor measuring apparatus includes a base portion, and a measuring optical fiber laid in the base portion. Adjacent linear portions of the measuring optical fiber are in contact with each other. The base portion may be plate-like. The measuring optical fiber may have the linear portion and a folded portion.

13 Claims, 8 Drawing Sheets

OPTICAL FIBER SENSOR MEASURING APPARATUS

CROSS-REFERENCE TO RELATED APPLICATION

This application claims priority from Japanese Patent Application No. 2017-166322 filed with the Japan Patent Office on Aug. 31, 2017, the entire content of which is hereby incorporated by reference.

BACKGROUND

1. Technical Field

The present invention relates to an optical fiber sensor measuring apparatus.

2. Description of the Related Art

When light enters an optical fiber, reflected light having a frequency reduced by about 11 GHz is generated due to a phenomenon of Brillouin scattering. It is known that this shift amount called Brillouin shift is proportional to distortion and temperature. As a distributed optical fiber sensor utilizing this phenomenon, Brillouin Optical Correlation-Domain Reflectometry (BOCDR) capable of measuring magnitude of distortion or temperature change at an arbitrary position along the optical fiber has been proposed.

Figure 10:
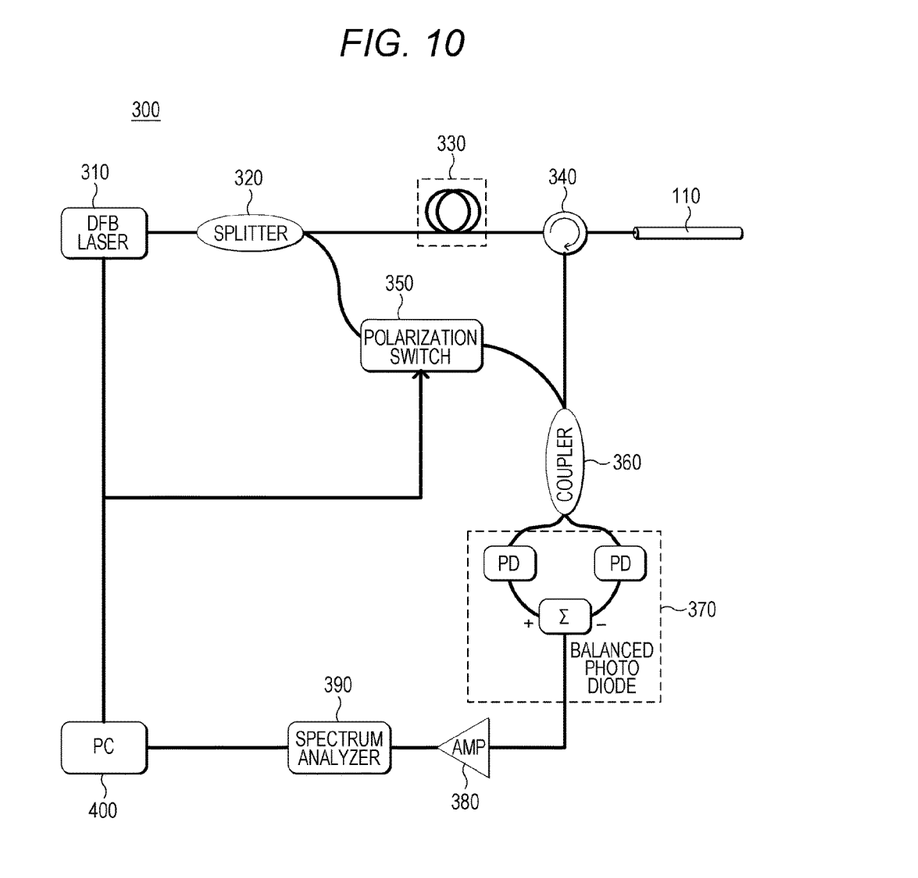
FIG. 10 is a diagram for explaining a principle of a BOCDR according to one or more embodiments of the present invention.

FIG. 10 is a diagram for explaining a principle of a BOCDR 300. In this figure, a laser beam emitted from a DFB laser 310 is split by a splitter 320. One of the split light beams enters a measuring optical fiber (FUT) 110 through a delay fiber 330 and a circulator 340. When frequency modulation is performed with an appropriate frequency in the DFB laser 310 using a technique of Synthesis of Optical Coherence Function (SOCF), intense light returns as Brillouin scattered light from a position to be measured in the measuring optical fiber 110.

The other of the light beams split by the splitter 320 passes through a polarization switch 350. At this time, its polarization direction is switched by time division. Thereafter, the light beam is combined with the return light by a coupler 360. The combined light is detected by a balanced photo diode 370. The detected signal is amplified by an RF amplifier 380 and the signal is detected by a spectrum analyzer 390. A measurement position in the measuring optical fiber 110 and measured values of temperature and distortion are output by a PC 400.

In the BOCDR 300, out of the light transmitted from the DFB laser 310 to the measuring optical fiber 110, light returning from a designated position is selectively detected by the frequency modulation. Among frequency components of the detected light, the frequency of inelastic scattered light (Brillouin scattered light) is measured. The frequency of the Brillouin scattered light is sensitive to the temperature and distortion acting on the measuring optical fiber 110. Therefore, by measuring a frequency variation amount, it is possible to measure the temperature and distortion at the measurement position of the measuring optical fiber 110.

Figure 11A:
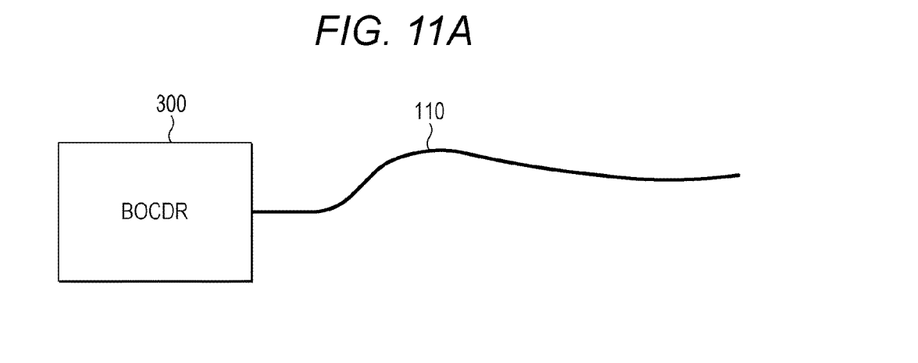
FIGS. 11A and 11B are schematic diagrams of temperature and distortion measurement using the BOCDR according to one or more embodiments of the present invention.
Figure 11B:
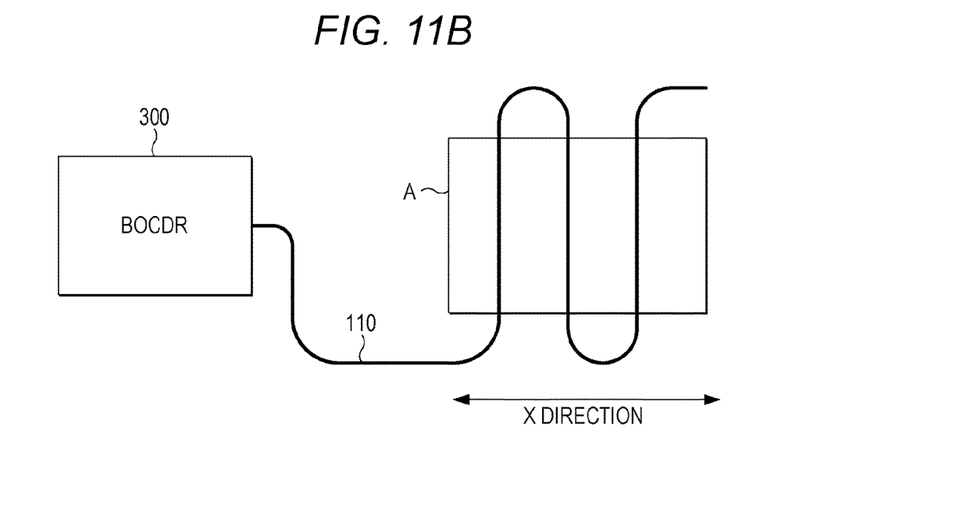

FIG. 11 is a schematic diagram of temperature measurement and distortion measurement using a BOCDR 300. As shown in FIG. 11A, the measuring optical fiber 110 is laid in a region where the temperature or the distortion is to be measured. When performing the temperature measurement or the distortion measurement in a surface region, as shown in FIG. 11B, the measuring optical fiber 110 is laid in a surface region A.

SUMMARY

An optical fiber sensor measuring apparatus according to one or more embodiments of the present invention includes a base portion and a measuring optical fiber laid in the base portion, wherein adjacent linear portions of the measuring optical fiber are in contact with each other.

DETAILED DESCRIPTION OF EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Currently, a spatial resolution of the BOCDR 300 is on the order of several centimeters in an extension direction of the measuring optical fiber 110. However, when the measurement is performed on a surface region using the BOCDR 300, this spatial resolution cannot be utilized enough in a direction (an X direction in FIG. 1B) perpendicular to a direction in which the optical fiber 110 extends in the surface region.

For example, measured values are predicted by numerical interpolation and the like.

One or more embodiments of the present invention improve the spatial resolution when measuring a surface region in a distributed optical fiber sensor.

An optical fiber sensor measuring apparatus according to one or more embodiments of the present invention includes a base portion (base), and a measuring optical fiber laid in the base portion, wherein adjacent linear portions of the measuring optical fiber are in contact with each other.

Here, the base portion may be plate-like, and the measuring optical fiber may have the linear portion and a folded portion.

Furthermore, the linear portion may extend in a first direction and in a second direction perpendicular to the first direction.

Furthermore, the base portion may have a three-dimensional shape having an outer peripheral surface, and the measuring optical fiber may be wound along the outer peripheral surface.

Furthermore, the base portion may have a plurality of tubes, and the measuring optical fiber may be passed through the tubes.

Furthermore, the base portion may have a plurality of grooves, and the measuring optical fiber may be fitted in the grooves.

In either case, the measuring optical fiber may be laid on the base portion so that the linear portions extending in the same direction are stacked.

According to one or more embodiments of the present invention, it is possible to improve the spatial resolution when measuring the surface region in the distributed optical fiber sensor.

Figure 1A:
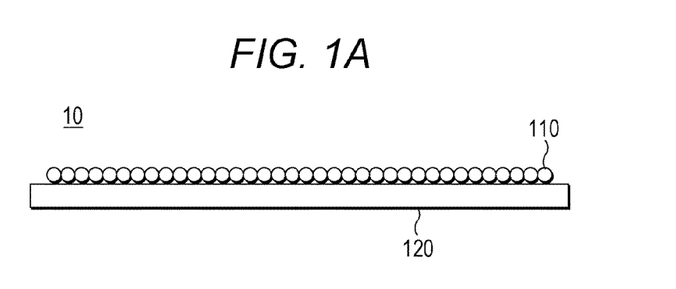
FIGS. 1A and 1B are diagrams schematically showing an optical fiber sensor measuring apparatus according to a first example of one or more embodiments of the present invention.
Figure 1B:
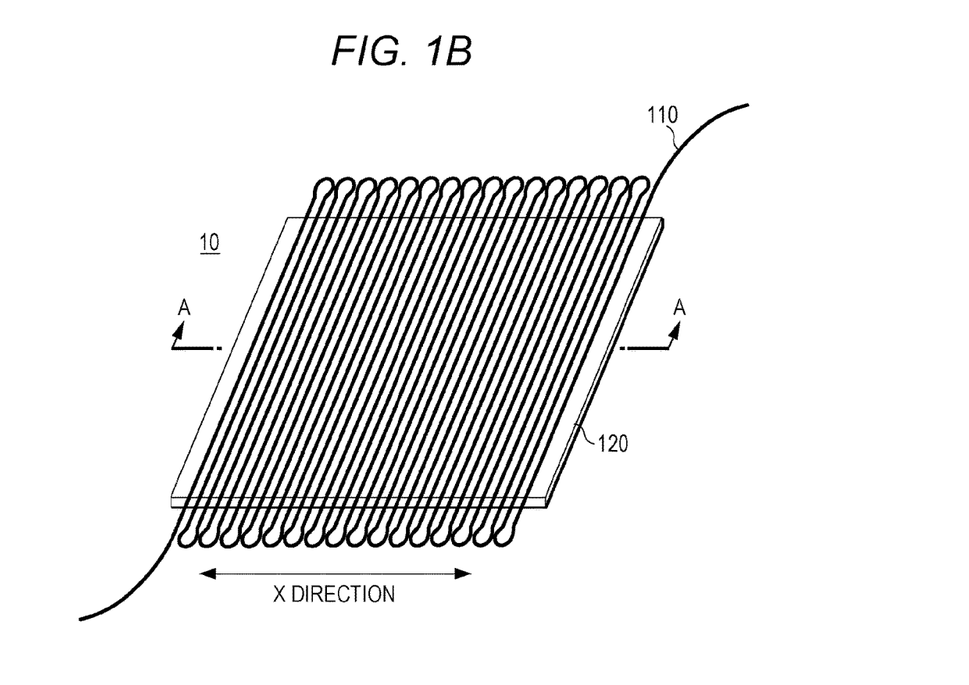

Embodiments of the present invention will be described with reference to the drawings. FIGS. 1A and 1B are diagrams schematically showing an optical fiber sensor measuring apparatus according to a first example of one or more embodiments of the present invention. FIG. 1A shows a cross-sectional view. FIG. 1B shows a perspective view. FIG. 1A corresponds to a cross-sectional view taken along a line A-A in FIG. 1B.

An optical fiber sensor measuring apparatus 10 is used as the measuring optical fiber (FUT) of the distributed optical fiber sensor. In particular, it is suitable for Brillouin Optical Correlation-Domain Reflectometry (BOCDR) which measures temperature or distortion.

As shown in FIGS. 1A and 1B, the optical fiber sensor measuring apparatus 10 includes the measuring optical fiber 110 and a plate-like base portion (base) 120. The optical fiber sensor measuring apparatus 10 has a structure in which the measuring optical fiber 110 is laid on the base portion 120. The base portion 120 may be a measurement object itself. Or, the base portion 120 formed of various materials such as resin, wood, metal, glass, paper, fiber, or the like may be attached to the measurement object.

A manner in which the measuring optical fiber 110 is laid on the base portion 120 may be such that the measuring optical fiber 110 covers a surface of the base portion 120. Or, the measuring optical fiber 110 may be embedded in the base portion 120. In the case of embedding, a part of the measuring optical fiber 110 may be exposed to the outside. Or, the measuring optical fiber 110 may be in a non-exposed state completely embedded in the base portion 120.

As shown in FIG. 1A, the measuring optical fiber 110 is laid on the base portion 120 so that side surfaces of adjacent optical fibers come into contact with each other. FIG. 1B shows that a gap exists between the side surfaces of the adjacent optical fibers. However, this is a convenience for illustration. Actually, the side surfaces of the optical fibers are in contact with each other. However, if it can be regarded as they are in contact with each other, some gap between the side surfaces of adjacent optical fibers is allowed. For example, if a clearance (gap) is not more than half the diameter of the measuring optical fiber 110, the optical fibers can be regarded as being in contact with each other. This also applies to the following examples.

In the measuring optical fiber 110, a linear portion extending in an extending direction and a folded portion bent for folding are alternately continued. At this time, the linear portion extending in the extending direction is a substantial measuring portion. Then, the adjacent linear portions are in contact with each other. Therefore, the surface region of the measurement object is covered with the linear portion of the measuring optical fiber 110 without any gap.

Both the linear portion and the folded portion can have a known length. Therefore, a surface distribution of temperature or distortion in the base portion 120 can be obtained by calculation from the distribution of temperature or distortion obtained, for example, by BOCDR.

For example, when a polyimide fiber having a diameter of 0.15 mm is used as the measuring optical fiber 110, the spatial resolution of 0.15 mm (150 μm) can be obtained in a direction (the X direction in FIG. 1B) perpendicular to the linear portion.

When the spatial resolution of BOCDR is 10 cm, the spatial resolution in the extending direction is 10 cm. In contrast, the spatial resolution of 0.15 mm, which is much higher than the spatial resolution of BOCDR, is obtained in the direction perpendicular to the extending direction.

Figure 2:
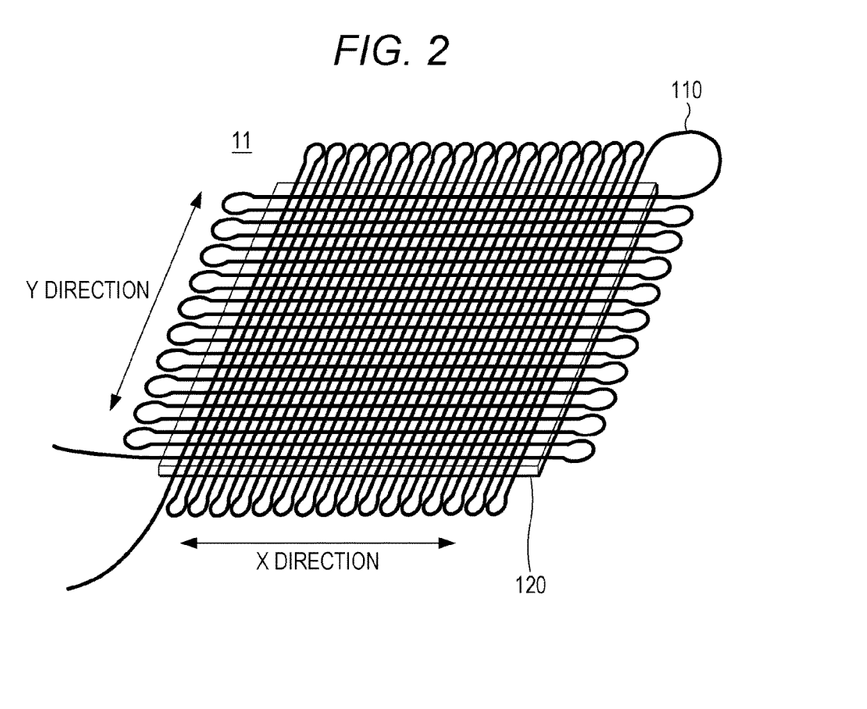
FIG. 2 is a diagram schematically showing the optical fiber sensor measuring apparatus according to a second example of one or more embodiments of the present invention.

Furthermore, in a second example, as shown in FIG. 2, the linear portion extending in the extending direction is also formed in a Y direction perpendicular to the X direction in addition to the X direction. By using such an optical fiber sensor measuring apparatus 11, in which the linear portions extending in the same direction and adjacent are in contact with each other, the spatial resolution of 0.15 mm, which is much higher than the spatial resolution of BOCDR, can be obtained in both directions.

Figure 3:
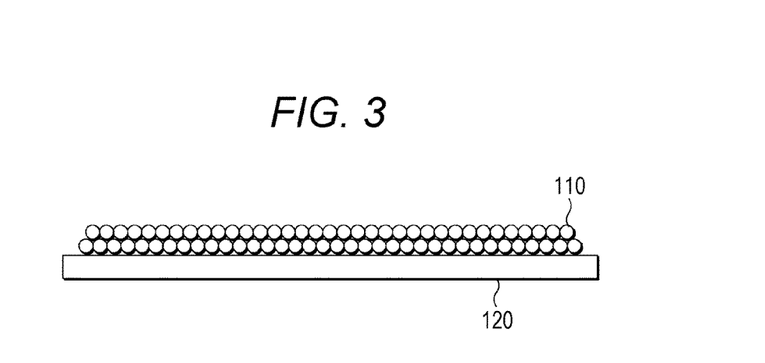
FIG. 3 is a diagram for explaining a case where measuring optical fibers are stacked in two stages according to one or more embodiments of the present invention.

In any of the examples, as shown in FIG. 3, the linear portions of the measuring optical fiber 110 are stacked in two stages on the base portion 120, and the adjacent linear portions are laid so as to contact three-dimensionally with each other. Thus, the spatial resolution in the direction perpendicular to the linear portion can be further doubled.

Figure 4:
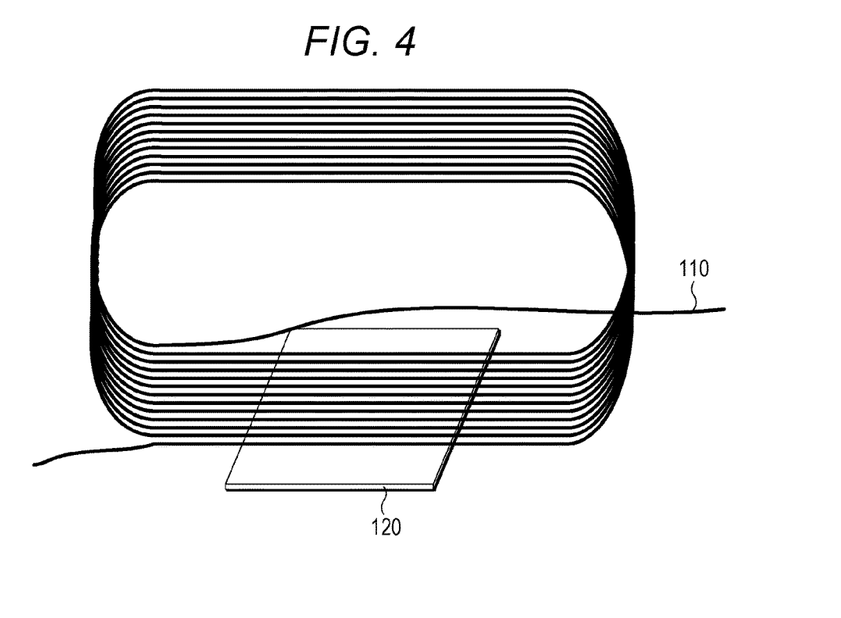
FIG. 4 is a diagram schematically showing the optical fiber sensor measuring apparatus according to a third example of one or more embodiments of the present invention.

When it is difficult to form a folded portion due to an allowable bending radius of the measuring optical fiber 110, as shown in FIG. 4 as a third example, the measuring optical fiber 110 may be wound with a larger diameter than a length of the base portion 120. In this way, one region of the bundled measuring optical fiber 110 may be laid on the base portion 120 with the adjacent linear portions in contact with each other.

Figure 5:
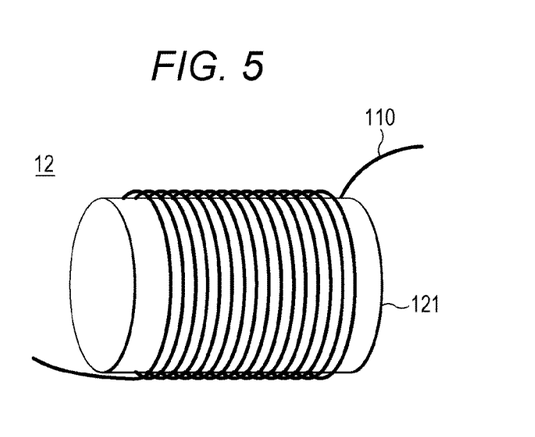
FIG. 5 is a diagram schematically showing the optical fiber sensor measuring apparatus according to a fourth example of one or more embodiments of the present invention.

The base portion may have a three-dimensional shape as well as a plate shape. For example, as shown in FIG. 5 as a fourth example, the measuring optical fiber 110 may be laid on a columnar base portion (base) 121 to configure the optical fiber sensor measuring apparatus 12. In this case, the linear portion is formed by being wound along an outer peripheral surface of the base portion 121. When the measuring optical fiber 110 is wound in close contact with the three-dimensional base portion 121, since the folded portion is not necessary, all parts of the wound measuring optical fiber 110 may be linear portions. Also in this case, the measuring optical fiber 110 is laid so that the adjacent linear portions are in contact with each other without any gap.

Figure 6:
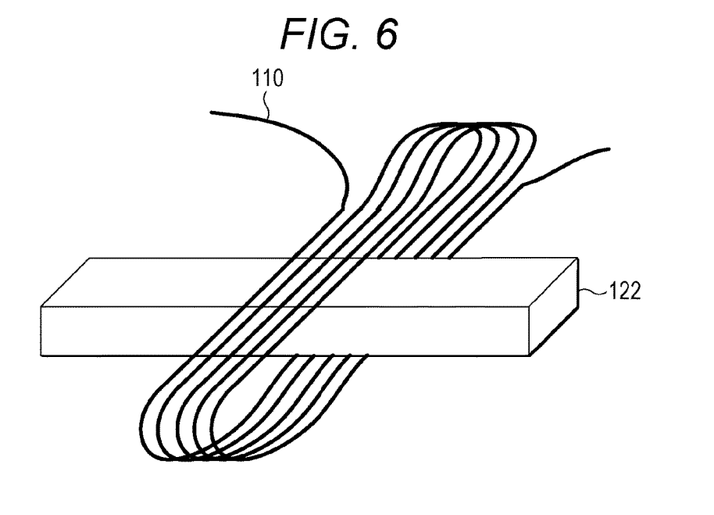
FIG. 6 is a diagram schematically showing the optical fiber sensor measuring apparatus according to a fifth example of one or more embodiments of the present invention.

The three-dimensional base portion is not limited to the columnar shape. For example, the three-dimensional base portion may be an elliptical columnar shape, a prismatic shape, or a spherical shape. FIG. 6 shows a fifth example in which the measuring optical fiber 110 is wound around a prismatic base portion (base) 122. In the example of this figure, the wound optical fiber is not in a close contact with the outer peripheral side surface of the base portion 122. Therefore, the linear portion and the folded portion are formed.

The optical fiber sensor measuring apparatus according to one or more embodiments of the present invention can be suitably applied to, for example, an apparatus for processing a semiconductor wafer, an RIE (Reactive Ion Etching) apparatus, or an ICP (Inductively Coupled Plasma) apparatus. In these apparatuses, since a temperature of the wafer to be processed greatly affects a processing speed (an etching speed), measurement of temperature distribution of the wafer is important for precision machining.

Figure 7:
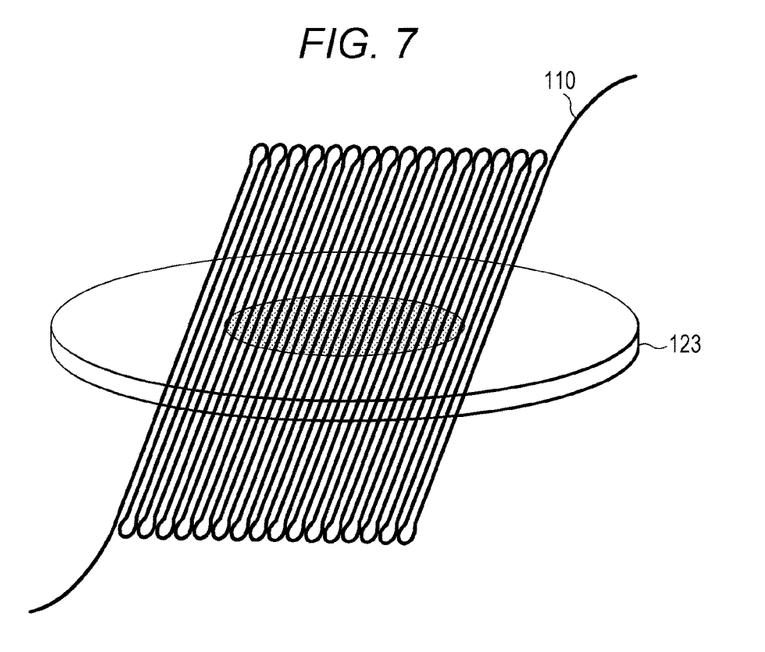
FIG. 7 is a diagram schematically showing the optical fiber sensor measuring apparatus according to a sixth example of one or more embodiments of the present invention.

For example, as shown in FIG. 7 as a sixth example, the measuring optical fiber 110 is embedded in a base portion 123 (base), as a stage on which the wafer is placed, so that the linear portions come into contact with each other, and thus the temperature distribution can be measured with high spatial resolution. Then, the obtained temperature distribution can be fed back to a stage cooling, a gas flow rate, or an etching condition in a plasma state.

Further, the optical fiber sensor measuring apparatus 12 using the three-dimensional base portion 121 as shown in FIG. 5 as a fourth example can be used for furnace temperature measurement of a CVD (Chemical Vapor Deposition) apparatus. In general, so-called point measurement, in which measurement is performed with several thermocouples in contact with a furnace, is widely performed. However, by using the present method, more precise distribution measurement can be performed.

A guide for laying the measuring optical fiber 110 may be provided in the base portion. For example, first, a plurality of tubes 125 is arranged on a surface of a base portion (base) 124 as shown on the left side of FIG. 8A. Then, as shown on the left side of FIG. 8B, an optical fiber sensor measuring apparatus 14 can be easily formed by passing the measuring optical fiber 110 through the tubes 125.

Figure 8A:
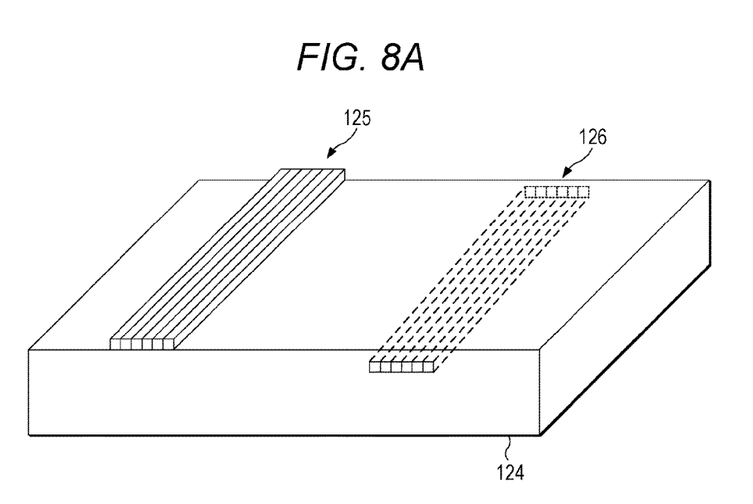
FIGS. 8A and 8B are diagrams for explaining a base portion provided with a tube according to one or more embodiments of the present invention.
Figure 8B:
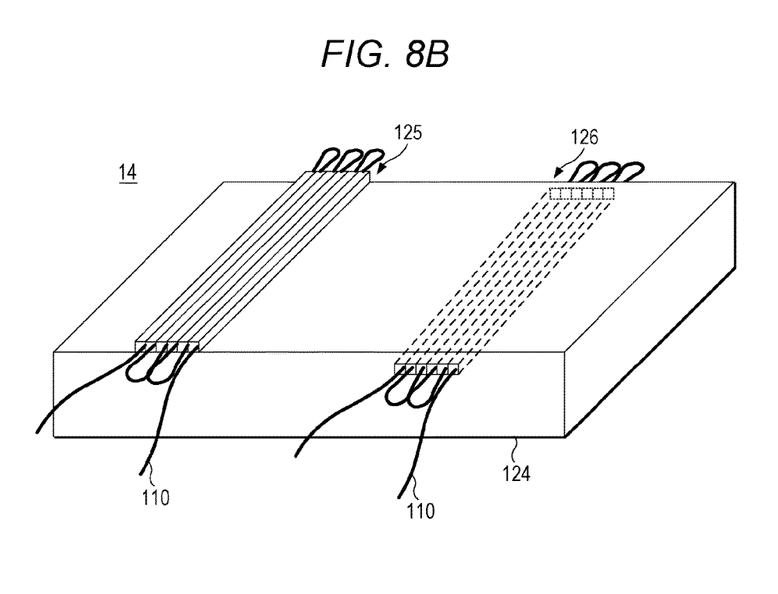

Or, as shown on the right side of FIG. 8A, a plurality of tubes 126 is arranged on an inner surface of the base portion 124. Then, as shown on the right side of FIG. 8B, the optical fiber sensor measuring apparatus 14 may be easily formed by passing the measuring optical fiber 110 through the tubes 126. In either case, since a thickness of the tube is substantially equal to the thickness of the measuring optical fiber 110 and an interval between the tubes is narrowed to not more than half the diameter of the measuring optical fiber 110, it can be regarded as the linear portions of the measuring optical fiber 110 are in contact with each other.

Figure 9A:
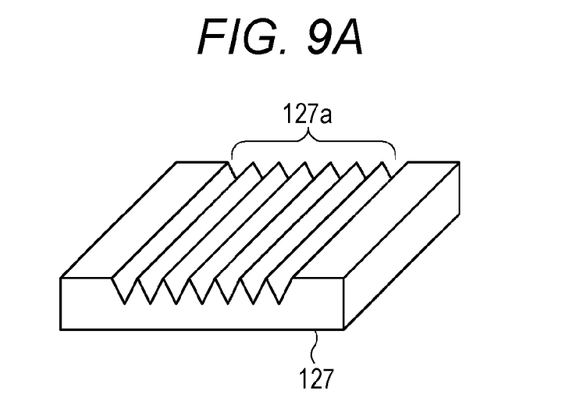
FIGS. 9A and 9B are diagrams for explaining the base portion provided with a groove according to one or more embodiments of the present invention.
Figure 9B:
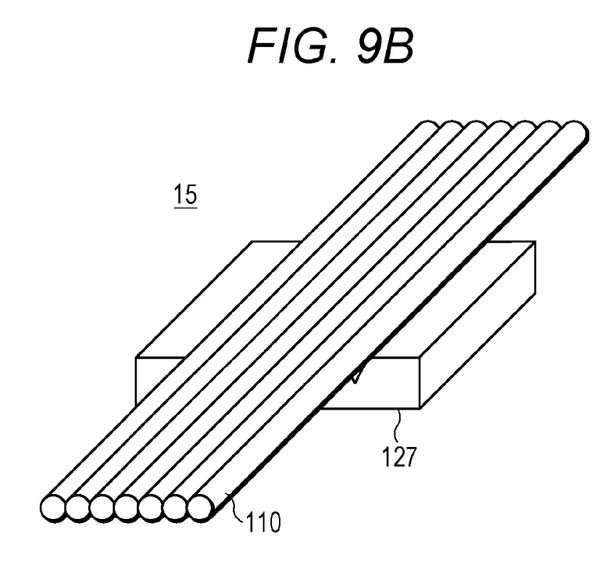

Further, as shown in FIG. 9A, a plurality of grooves 127a is formed on a surface of a base portion (base) 127, and as shown in FIG. 9B, the linear portion of the measuring optical fiber 110 is fitted into each groove 127a, so that the optical fiber sensor measuring apparatus 15 may be formed. An interval between the grooves 127a is set so that the linear portions of the measuring optical fiber 110 fitted in the grooves 127a come into contact with each other.

As described above, according to the optical fiber sensor measuring apparatus of one or more embodiments of the present invention, since the linear portions of the adjacent measuring optical fibers are in contact with each other, it is possible to improve the spatial resolution when measuring the surface region.

An optical fiber sensor measuring unit according to one or more embodiments of the present invention may be any one of following first to seventh optical fiber sensor measuring unit.

The first optical fiber sensor measuring unit is characterized by including the base portion and the measuring optical fiber laid in the base portion with the adjacent linear portions in contact with each other.

The second optical fiber sensor measuring unit is the first optical fiber sensor measuring unit characterized in that the base portion is plate-like and the measuring optical fiber is formed with the linear portion and the folded portion.

The third optical fiber sensor measuring unit is the second optical fiber sensor measuring unit characterized in that the linear portion is formed in the first direction and the second direction perpendicular to the first direction.

The fourth optical fiber sensor measuring unit is the first optical fiber sensor measuring unit characterized in that the base portion has the three-dimensional shape having the outer peripheral surface, and the measuring optical fiber is wound along the outer peripheral surface.

The fifth optical fiber sensor measuring unit is the first optical fiber sensor measuring unit characterized in that the plurality of tubes is formed in the base portion and the measuring optical fiber is passed through the tubes.

The sixth optical fiber sensor measuring unit is the first optical fiber sensor measuring unit characterized in that the plurality of grooves is formed in the base portion and the measuring optical fiber is fitted in the grooves.

The seventh optical fiber sensor measuring unit is any one of the first to sixth optical fiber sensor measuring unit, characterized in that the linear portions are arranged to be stacked in the same direction and the adjacent linear portions are in contact with each other.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber sensor measuring apparatus comprising:
    a base on which a measurement object is disposed; and
    a measuring optical fiber laid on a surface of the base, wherein the measuring optical fiber comprises:
   a plurality of linear portions that extend in an extension direction; and
   a folded portion where the measuring optical fiber bends,
adjacent linear portions among the linear portions directly or indirectly contact each other along the extension direction,
the linear portions of the measuring optical fiber are disposed on the surface of the base and respond to light from the measurement object, and
the folded portion of the measuring optical fiber is outside of the linear portions disposed on the surface of the base.

2. The optical fiber sensor measuring apparatus according to claim 1, wherein
   the base has a plate-like shape.

3. The optical fiber sensor measuring apparatus according to claim 1, wherein
   the linear portions include first linear portions extending in a first direction and second linear portions extending in a second direction perpendicular to the first direction.

4. The optical fiber sensor measuring apparatus according to claim 1, wherein
   the base has a three-dimensional shape having an outer peripheral surface, and
   the measuring optical fiber is wound along the outer peripheral surface.

5. The optical fiber sensor measuring apparatus according to claim 1, wherein
   the base comprises a plurality of tubes, and
   the measuring optical fiber is passed through the tubes.

6. The optical fiber sensor measuring apparatus according to claim 1, wherein
   the base comprises a plurality of grooves, and
   the measuring optical fiber is fitted in the grooves.

7. The optical fiber sensor measuring apparatus according to claim 1, wherein
   the linear portions extending in the extension direction are stacked.

8. The optical fiber sensor measuring apparatus according to claim 2, wherein
   the linear portions extending in the extension direction are stacked.

9. The optical fiber sensor measuring apparatus according to claim 3, wherein
   the linear portions extending in the extension direction are stacked.

10. The optical fiber sensor measuring apparatus according to claim 4, wherein
    the linear portions extending in the extension direction are stacked.

11. The optical fiber sensor measuring apparatus according to claim 5, wherein
    the linear portions extending in the extension direction are stacked.

12. The optical fiber sensor measuring apparatus according to claim 6, wherein
    the linear portions extending in the extension direction are stacked.

13. The optical fiber sensor measuring apparatus according to claim 1, wherein
    the measuring optical fiber is used for Brillouin Optical Correlation-Domain Reflectometry (BOCDR).

* * * * *